United States Patent
Albanese et al.

(10) Patent No.: US 9,272,360 B2
(45) Date of Patent: Mar. 1, 2016

(54) UNIVERSAL PLASMA EXTENSION GUN

(71) Applicant: General Electric Company, Schenectady, NY (US)

(72) Inventors: Joseph Garfield Albanese, Rotterdam Junction, NY (US); Donald Joseph Baldwin, Galway, NY (US); James Allen Fisk, Gansevoort, NY (US); Christopher Joseph Lochner, Albany, NY (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 13/795,416

(22) Filed: Mar. 12, 2013

(65) Prior Publication Data

US 2014/0263204 A1 Sep. 18, 2014

(51) Int. Cl.
| | |
|---|---|
| *B23K 9/02* | (2006.01) |
| *B23K 10/00* | (2006.01) |
| *B05B 7/22* | (2006.01) |
| *B05B 13/04* | (2006.01) |
| *B05B 15/06* | (2006.01) |
| *H05H 1/42* | (2006.01) |
| *B05B 13/06* | (2006.01) |

(52) U.S. Cl.
CPC ............. *B23K 10/00* (2013.01); *B05B 7/222* (2013.01); *B05B 13/0431* (2013.01); *B05B 15/065* (2013.01); *H05H 1/42* (2013.01); *B05B 13/06* (2013.01)

(58) Field of Classification Search
CPC .............................. B23K 10/00; B23K 10/006
USPC ................ 219/121.48, 121.5, 121.52, 121.53
See application file for complete search history.

(56) References Cited

U.S. PATENT DOCUMENTS

| | | | |
|---|---|---|---|
| 4,445,021 | A | 4/1984 | Irons et al. |
| 4,649,257 | A | 3/1987 | Yakovlevitch et al. |
| 4,788,402 | A | 11/1988 | Browning |
| 4,841,114 | A | 6/1989 | Browning |
| 4,853,515 | A * | 8/1989 | Willen et al. ............ 219/121.47 |

(Continued)

FOREIGN PATENT DOCUMENTS

| | | |
|---|---|---|
| EP | 1925368 A2 | 5/2008 |
| WO | 9204133 A1 | 3/1992 |

OTHER PUBLICATIONS

European Search Report issued in connection with corresponding EP Application No. 14158432.6 on Aug. 7, 2014.

(Continued)

*Primary Examiner* — Dana Ross
*Assistant Examiner* — Ayub Maye
(74) *Attorney, Agent, or Firm* — Ernest G. Cusick; Hoffman Warnick LLC

(57) ABSTRACT

Universal plasma spray extension gun systems and devices for thermal spraying of machine components are disclosed. In one embodiment, a plasma gun extension system includes: a plasma extension arm; an arm connector disposed on the plasma extension arm and configured to connect to an adjustable plasma spray gun apparatus; an arm coupler disposed on the plasma extension arm and configured to connect the plasma extension arm to a robotic arm; and a set of feed conduits disposed on the plasma extension arm between the arm coupler and the arm connector, the set of feed conduits configured to supply a flow to the adjustable plasma spray gun apparatus.

14 Claims, 14 Drawing Sheets

(56) References Cited

U.S. PATENT DOCUMENTS

| | | | |
|---|---|---|---|
| 4,916,273 A | 4/1990 | Browning | |
| 4,924,059 A | 5/1990 | Rotolico et al. | |
| 5,008,511 A | 4/1991 | Ross | |
| 5,225,652 A | 7/1993 | Landes | |
| 5,332,885 A | 7/1994 | Landes | |
| 5,406,046 A | 4/1995 | Landes | |
| 5,444,209 A | 8/1995 | Crawmer et al. | |
| 5,452,854 A | 9/1995 | Keller | |
| 5,556,558 A | 9/1996 | Ross et al. | |
| 6,068,201 A | 5/2000 | Hawley et al. | |
| 6,114,649 A | 9/2000 | Delcea | |
| 6,202,939 B1 | 3/2001 | Delcea | |
| 6,374,158 B1 * | 4/2002 | Fusaro, Jr. | 700/254 |
| 6,392,189 B1 | 5/2002 | Delcea | |
| 6,559,407 B2 | 5/2003 | Chancey et al. | |
| 7,375,301 B1 | 5/2008 | Noujaim | |
| 7,578,451 B2 * | 8/2009 | Mueller | 239/132.3 |
| 7,959,983 B1 | 6/2011 | Farrar et al. | |
| 8,030,592 B2 | 10/2011 | Weidman | |
| 2005/0077272 A1 | 4/2005 | Fusaro et al. | |
| 2006/0108332 A1 | 5/2006 | Belashchenko | |
| 2008/0121624 A1 | 5/2008 | Belashchenko et al. | |
| 2008/0187676 A1 * | 8/2008 | Blankenship | 427/446 |
| 2008/0251503 A1 | 10/2008 | Noujaim | |
| 2011/0049110 A1 * | 3/2011 | Lochner et al. | 219/121.5 |

OTHER PUBLICATIONS

Molz et al., "Better Performance of Plasma Thermal Spray", Advanced Materials and Processes, Aug. 2006, pp. 65-67.

* cited by examiner

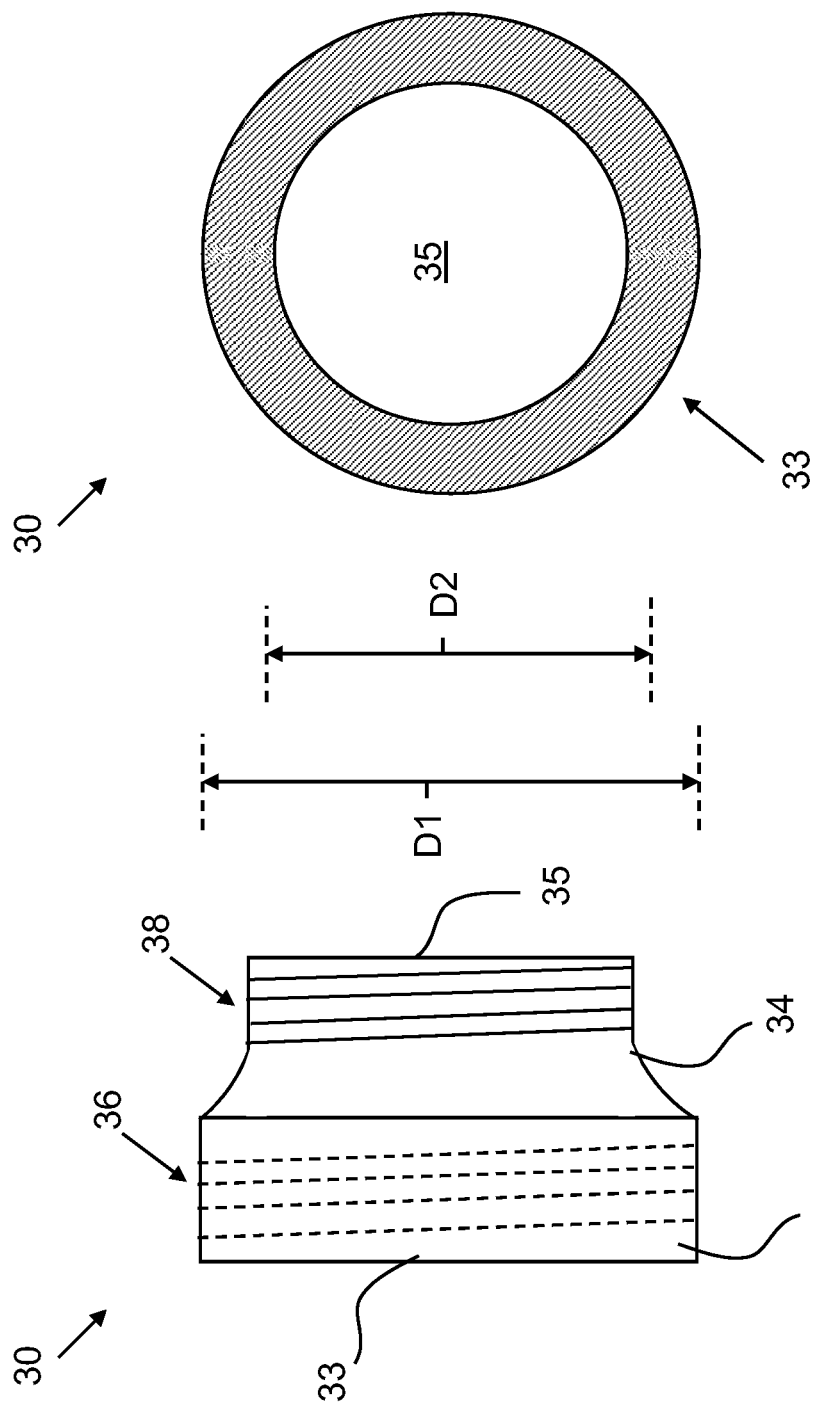

UNIVERSAL PLASMA EXTENSION GUN

BACKGROUND OF THE INVENTION

The subject matter disclosed herein relates to plasma spray guns. Specifically, the subject matter disclosed herein relates to a universal plasma extension gun including at least one extension arm.

Thermal spraying is a coating method wherein powder or other feedstock material (e.g., metals, ceramics, etc.) is fed into a stream of heated gas produced by a plasmatron or by the combustion of fuel gasses, for application on a surface/machine component. The hot gas stream entrains the feedstock to which it transfers heat and momentum. The heated feedstock is further impacted onto the surface, where it adheres and solidifies, forming a thermally sprayed coating composed of thin layers or lamellae.

One common method of thermal spraying is plasma spraying. Plasma spraying is typically performed by a plasma torch or gun, which uses a plasma jet to heat or melt the feedstock before propelling it toward a desired surface. Current plasma spray guns are commonly configured to operate in a single set position with respect to a component (e.g., at a single contact distance) at one power mode (e.g., 75 kW). As a result, application of thermal spray coatings to components which include a variety of surfaces, configurations and/or different shapes (e.g., interior diameter features, outer diameter features, a plurality of varied components, etc.), may require the use of a plurality of plasma spray guns, arranged in different positions. This multitude of plasma spray guns and need for repeated spray gun substitution, configuration and calibration throughout application processes may greatly increase part production time, component expense, and maintenance equipment inventory. Additionally, some of these features (e.g., cavities, interior diameters, etc.) may be difficult to access and/or coat for technicians and robotic arms which may not be able to extend within these features. As a result, designs may be limited and/or production time may be greatly increased.

BRIEF DESCRIPTION OF THE INVENTION

Universal plasma spray extension gun systems and devices for thermal spraying of machine components are disclosed. In one embodiment, a plasma gun extension system includes: a plasma extension arm; an arm connector disposed on the plasma extension arm and configured to connect to an adjustable plasma spray gun apparatus; an arm coupler disposed on the plasma extension arm and configured to connect the plasma extension arm to a robotic arm; and a set of feed conduits disposed on the plasma extension arm between the arm coupler and the arm connector, the set of feed conduits configured to supply a flow to the adjustable plasma spray gun apparatus.

A first aspect of the disclosure provides a plasma gun extension system that includes: a plasma extension arm; an arm connector disposed on the plasma extension arm and configured to connect to an adjustable plasma spray gun apparatus; an arm coupler disposed on the plasma extension arm and configured to connect the plasma extension arm to a robotic arm; and a set of feed conduits disposed on the plasma extension arm between the arm coupler and the arm connector, the set of feed conduits configured to supply a flow to the adjustable plasma spray gun apparatus.

A second aspect provides an inspection system including: a plasma extension arm configured to extend in to an interior diameter of a component; an adjustable plasma spray gun connected to the plasma extension arm, the adjustable plasma spray gun including: an electrode body housing an electrode; a plasma spray gun body having a fore portion and an aft portion, the aft portion having an axial opening configured to removably attach to one of the electrode or a first coupler; and the first coupler removably attached to the plasma spray gun body at the axial opening of the plasma spray gun body, the coupler including: a first portion having a first axial opening configured to removably attach to the plasma spray gun body; and a second portion having a second axial opening configured to removably attach to one of the electrode body or a second coupler; and a set of feed conduits disposed on the plasma extension arm and configured to supply a flow to the adjustable plasma spray gun.

A third aspect provides a universal plasma extension gun system including: a robotic arm; a plasma extension arm connected to the robotic arm and configured to extend in to an interior diameter of a component; an adjustable plasma spray gun connected to the plasma extension arm, the adjustable plasma spray gun including: an electrode body housing an electrode, a plasma spray gun body defining an exit annulus, and a set of ports disposed proximate the exit annulus; and a set of feed conduits disposed on the plasma extension arm and configured to supply a flow to the set of ports.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 8 shows a side view of a coupler according to an embodiment of the invention.

FIG. 9 shows a cross-sectional front view of the coupler of FIG. 4B.

Figure 1:
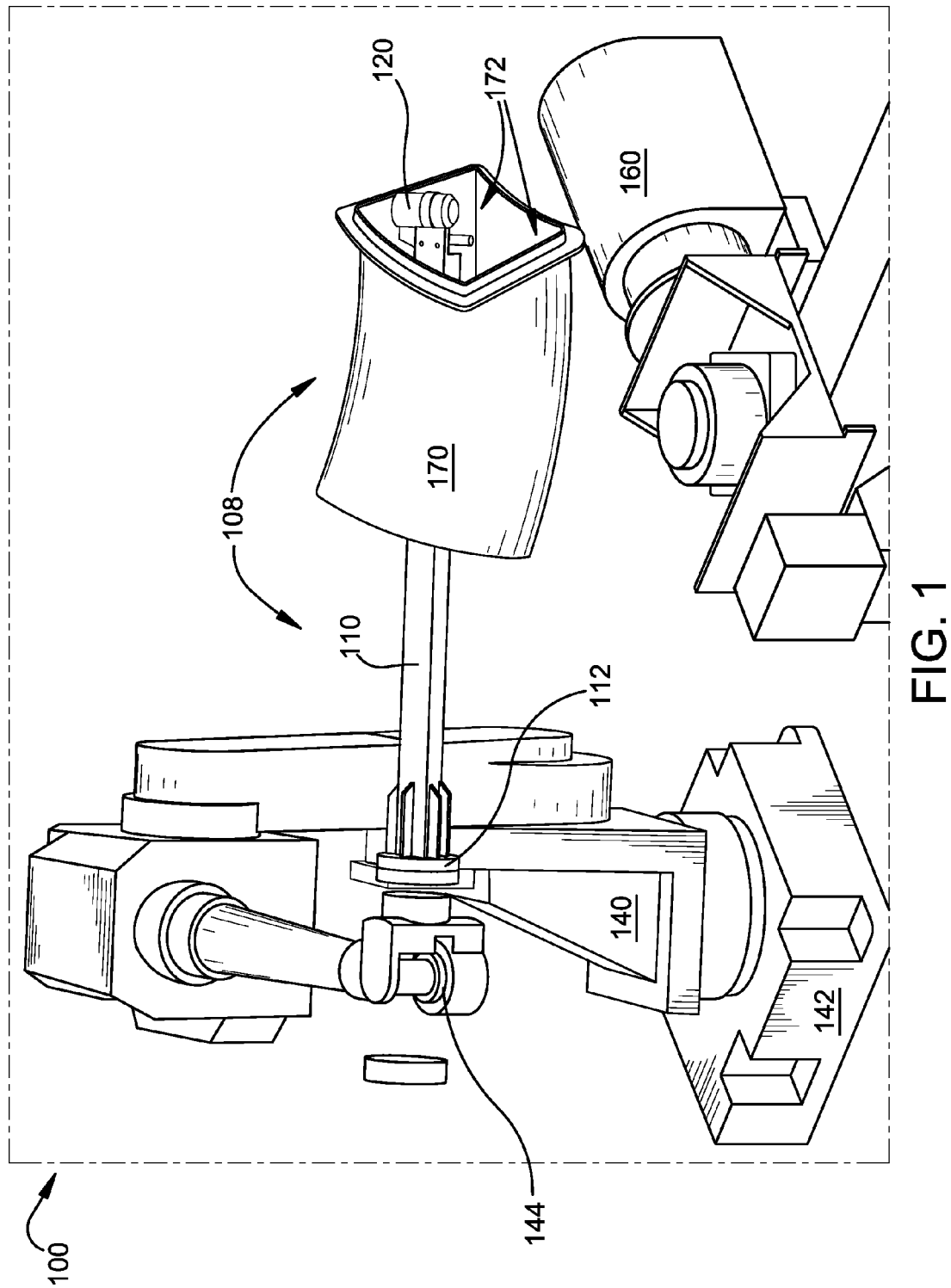
FIG. 1 shows a three-dimensional schematic view of an environment including a thermal spray system in accordance with an embodiment of the invention.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-15, like numbering may represent like elements. Redundant explanation of these elements has been omitted for clarity. Finally, it is understood that the components of FIGS. 1-15 and their accompanying descriptions may be applied to any embodiment described herein.

DETAILED DESCRIPTION OF THE INVENTION

As indicated above, aspects of the invention provide for a universal plasma spray extension gun. During operation, plasma spray guns are typically mounted on a robotic arm or robotic apparatus. A machine component (e.g., a nozzle) is typically mounted on a holder at a distance from the plasma spray gun's fore end (exit annulus). This distance is known as the "standoff distance." The standoff distance may be dictated in part by the type of component to be sprayed and the type of material to be applied. During operation, plasma spray leaves the gun's exit annulus and is propelled toward the component. Spraying different components, or different portions of the same component, may require using different plasma spray guns with different power levels. For example, in order to spray at a higher power level, a first plasma spray gun may be removed from the robotic arm and replaced with a larger (e.g., longer) plasma spray gun. While the larger plasma spray gun allows for plasma spraying at a higher power level, it may also require extensive operational modifications before it can begin spraying the component. For example, when the larger gun is mounted to the robotic arm previously configured for the smaller gun, the increased length of the larger gun means that the standoff distance is reduced. In this case, in order to maintain the proper standoff distance, the robotic arm may require adjusting (e.g., via reprogramming). This reprogramming step may be inconvenient to the operator and cause delays in the spraying process. Additionally, the size and dimensions of the robotic arm may prohibit access to certain component features (e.g., interior diameters) which are smaller than the robotic arm, these geometric shapes preventing proper application of the spray coating by the plasma spray gun. Therefore, aspects of the present invention provide for a system including a plasma extension arm and an adjustable plasma spray gun that may extend within component features and efficiently adapt to different plasma spray power needs without the need to move (e.g., reprogram) the robotic arm or apparatus. Specifically, aspects of the present invention provide for a system including a plasma extension arm and an adjustable plasma spray gun that may access component features (e.g., interior dimensions) and extend and/or retract at an aft end in response to power and operational needs.

As used herein, the terms "axial" and/or "axially" refer to the relative position/direction of objects along axis A, which is substantially perpendicular to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

Turning to the FIGS., embodiments of systems and devices for application of thermal spray coating to machine component surfaces are shown, where the systems may increase efficiency and production time, by increasing the versatility and accessibility of a plasma spray gun. Each of the components in the FIGS. may be connected via conventional means, e.g., via a common conduit or other known means as is indicated in FIGS. 1-15. Referring to the drawings, FIG. 1 shows a three-dimensional schematic illustration of a high-efficiency laminar flow universal plasma extension gun system 100 operably connected to a component 170 (e.g., a nozzle, a conduit, etc.) in accordance with embodiments of the invention. Extension gun system 100 includes a robotic arm 140 connected to a base 142 and configured to manipulate a plasma spray gun 120 during thermal spray coating operations. In an embodiment, robotic arm 140 may be connected to plasma spray gun 120 via a plasma extension arm 110. Plasma extension arm 110 may have a variable length (e.g., adjustable) and may be connected to plasma spray gun 120 via an arm connector 122 (shown in FIG. 3). Robotic arm 140 may connect to plasma extension arm 110 via an arm coupler 112.

In an embodiment, robotic arm 140 may include a set of joints 144 configured to enable articulation and/or multi-axis manipulation of a position of plasma spray gun 120 via plasma extension arm 110. In operation, plasma spray gun 120 may apply a thermal spray coating (e.g., a metal coating, a ceramic coating, etc.) to a surface 172 of component 170. Application of the thermal spray coating may be controlled by a technician and/or computing device via robotic arm 140 and plasma extension arm 110. In one embodiment, component 170 may be disposed on a component holder 160 and oriented so as to enable plasma extension arm 110 to extend within and/or manipulate plasma spray gun 120 about an interior diameter (ID) of component 170 during application of a thermal spray coating. In an embodiment, plasma spray gun 120 may produce a laminar flow of coating.

Figure 2:
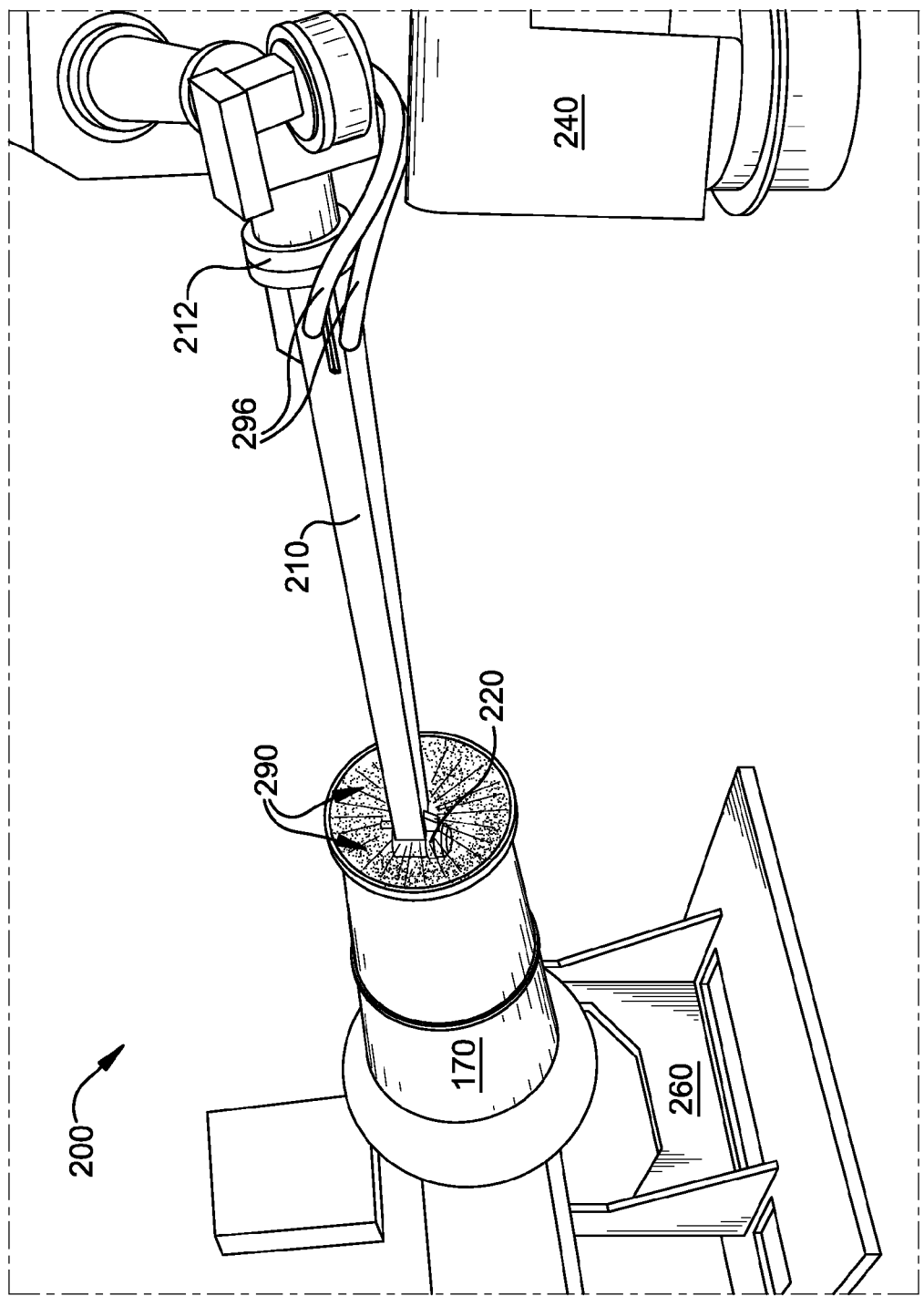
FIG. 2 shows a schematic view of an environment including a system in accordance with an embodiment of the invention.

Turning to FIG. 2, a three-dimensional schematic illustration of a high-efficiency laminar flow universal plasma extension gun system 200 applying a thermal spray coating 290 to component 170 (e.g., a nozzle, a conduit, etc.) is shown in accordance with embodiments of the invention. Component 170 may be held in place by a component holder 260 while a plasma spray gun 220 is manipulated about an interior diameter (ID) of component 170 by a robotic arm 240 via plasma extension arm 210. Plasma spray gun 220 may apply thermal spray coating 290 via a set of supply conduits 296 (e.g., powder lines, power lines, fluid lines, etc.) which may be integrated into plasma extension arm 210. In an embodiment, plasma extension arm 210 may extend substantially within component 170 such that plasma spray gun 220 may coat an entirety of the interior of component 170.

Figure 3:
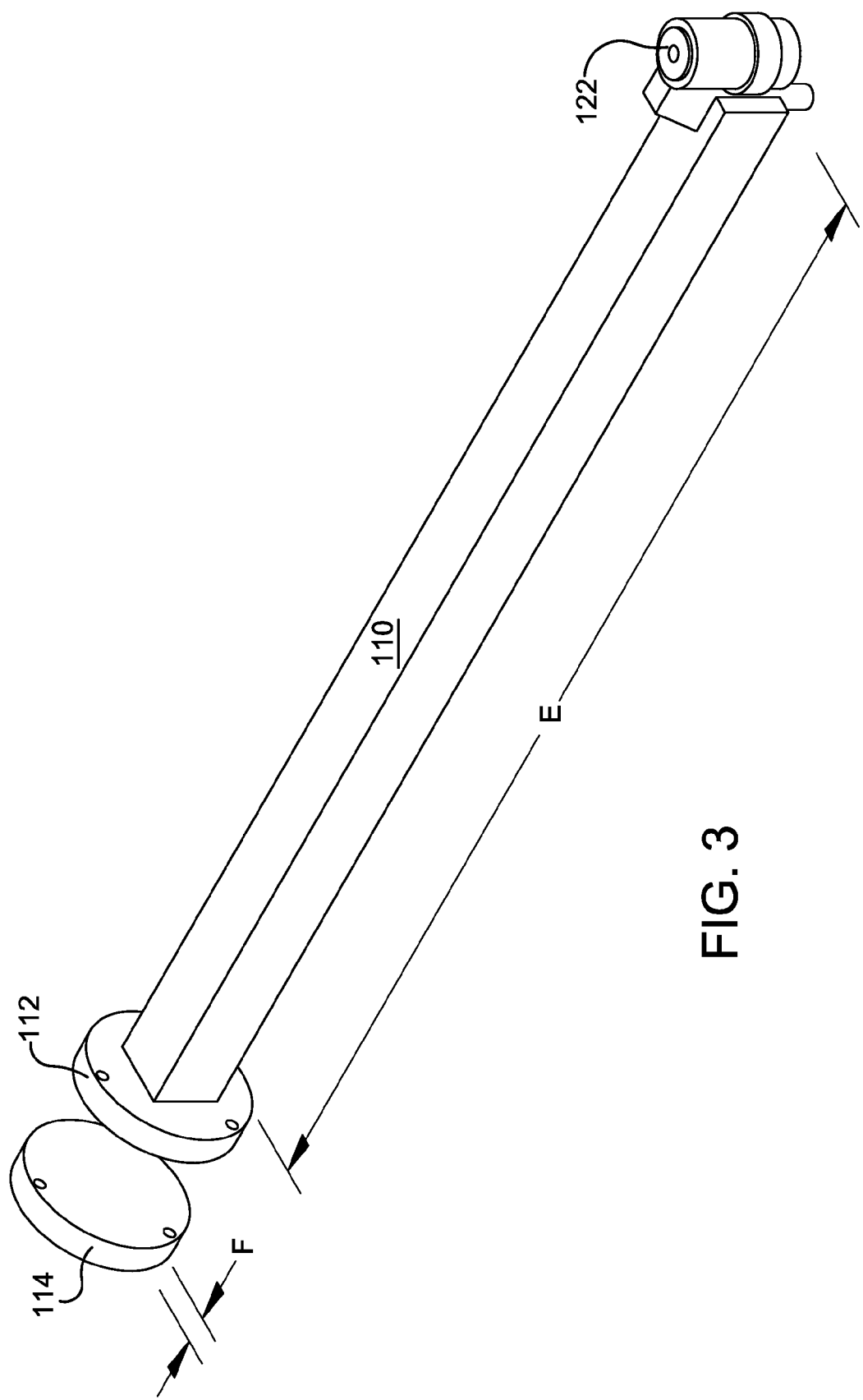
FIG. 3 shows a schematic view of an adjustable plasma spray gun arm in accordance with embodiments of the invention.

Turning to FIG. 3, a three-dimensional schematic illustration of a plasma extension arm 110 including an arm connector 122 is shown in accordance with embodiments of the invention. Plasma extension arm 110 may have a length 'E' which enables robotic arm 140 to locate and/or operate plasma spray gun 120 (shown in FIGS. 1 and 2) substantially within an interior dimension (e.g., a conduit, a cavity, an aperture, etc.) of a specimen/machine component 170. In an embodiment, plasma extension arm 110 may be extendable. In one embodiment, plasma extension arm 110 may be telescopic (e.g., include a number of shaft components adjustably connected via a set of twist collars). In another embodiment, plasma extension arm 110 may include a plurality of segments/flanges connected (e.g., bolted) to one another. In one embodiment, plasma extension arm 110 may have a length 'E' of between about 50 centimeters and about 200 centimeters.

In an embodiment, plasma extension arm 110 may include an arm coupler 112 configured to connect to robotic arm 140 (shown in FIGS. 1 and 2) and/or an arm extender 114. Arm extender 114 may matingly engage arm coupler 112 and robotic arm 140, thereby operably connecting robotic arm 140 and plasma extension arm 110. In an embodiment, arm extender 114 may have a thickness 'F' which increases a reach/length/extension of plasma extension arm 110. Arm extender 114 may include a plurality of components which may be connected between arm coupler 112 and robotic arm 114 so as to adjust a distance/thickness F between robotic arm 140 and arm connector 122. In one embodiment, plasma extension arm 110 may be bolted to robotic arm 140 and/or arm extender 114. In another embodiment, plasma extension arm 110 may be coupled to robotic arm 140 and/or arm extender 114 via a threaded coupler.

Figure 4:
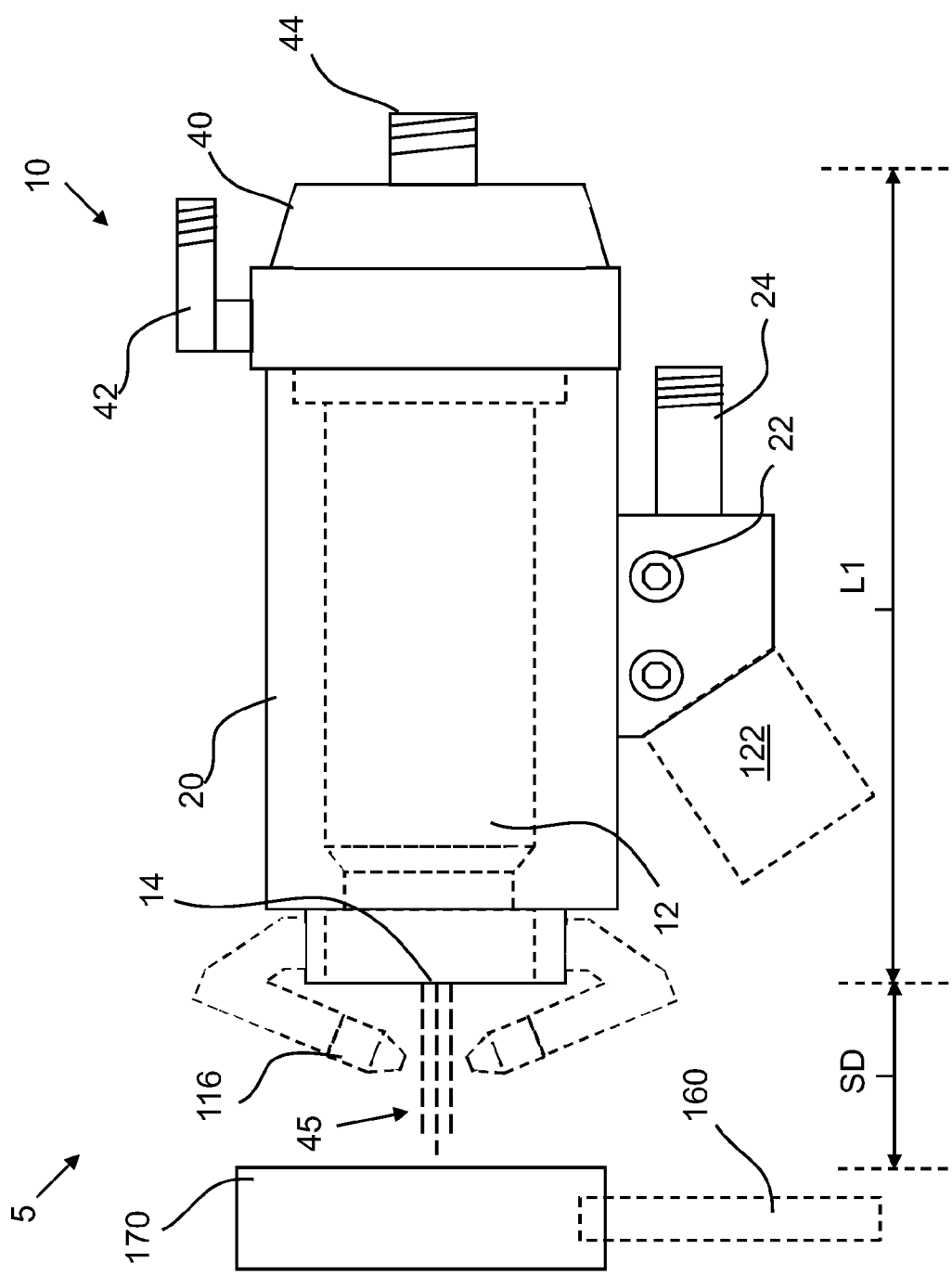
FIG. 4 shows a side view of a plasma spray gun system according to an embodiment of the invention.

Turning to FIG. 4, a portion of a plasma spray gun system 5 is shown including an adjustable plasma spray gun apparatus 10, a component 170, a component holder 160 (shown in phantom), an arm connector 122 (shown in phantom) and one or more injector ports 116 (shown in phantom). Adjustable plasma spray gun apparatus 10 may include a plasma spray gun body 20, which may hold a plasma spray gun nozzle 12 (shown in phantom). Plasma spray gun body 20 and plasma spray gun nozzle 12 may share an exit annulus 14, and may be electrically connected. Plasma spray gun body 20 may further include one or more mounts 22 for attaching to arm connector 172, and a port 24 for receiving and/or expelling water from an external source (not shown). Port 24 may also connect to an external electric power supply (not shown). Plasma spray gun body 20 may be removably attached to an electrode body 40 at one portion, however, plasma spray gun body 20 is electrically insulated from the electrode housed within electrode body. Electrode body 40 may include a plasma gas port 42 for receiving a plasma gas from an external source (not shown), and a port 44 for receiving and/or expelling water from an external source (not shown). Port 44 may also connect to an external electric power supply (not shown). Descriptions of external water, electric power and gas supplies, as well as cooling systems, are omitted herein, and function substantially similarly to those known in the art. Plasma spray gun apparatus 10 may have a length L1, which may include the distance from approximately the aft end of electrode (farthest end from component 170) to exit annulus 14. The distance between exit annulus 14 and component 170 is shown as the standoff distance SD. As further described herein and illustrated in the Figures, plasma spray gun system 5 may allow for spraying one or more components 110 at different power levels while maintaining a fixed standoff distance SD.

During operation of plasma spray gun system 5, an arc is formed inside electrode body 40 and plasma spray gun body 20, where electrode body 40 acts as a cathode electrode and plasma spray gun body 20 acts as an anode. Plasma gas is fed through plasma gas port 42, and extends the arc to exit annulus 14, where injector ports 116 may supply feedstock material into a plasma jet stream 45 as it leaves plasma spray gun body 20 and plasma spray gun nozzle 12 via exit annulus 14. Injector ports 116 may allow for radial supply of feedstock into plasma jet stream 45. Feedstock may be, for example, a powder entrained in a carrier gas and/or a suspension solution. However, feedstock used in the embodiments described herein may be any feedstock material used in plasma spraying. Plasma jet stream 45, including feedstock, is then propelled toward component 170, thereby coating it. Standoff distance SD is designed so as to optimize spraying conditions for a particular component 170.

Figure 5:
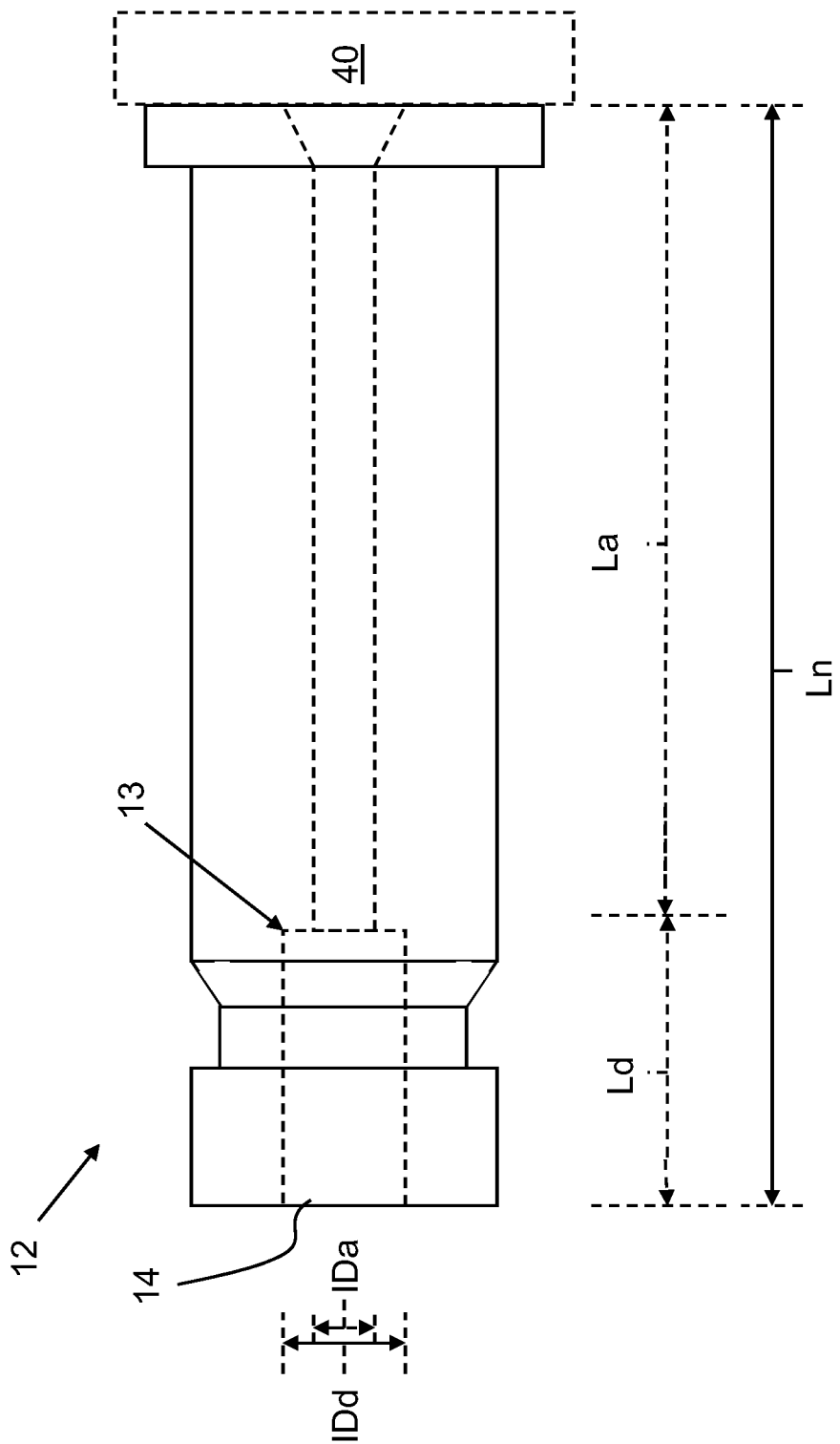
FIG. 5 shows a side view of a plasma spray gun nozzle according to an embodiment of the invention.

The power of a plasma spray gun is partly driven by the length of its plasma "arc" (arc length). The arc length is a component of the total length of plasma spray gun nozzle 12. Turning to FIG. 5, a side view of one embodiment of plasma spray gun nozzle 12 (nozzle) is shown. Also included in FIG. 5 is a portion of electrode body 40 (shown in phantom). Nozzle 12 may have an inner diameter of its arc portion (IDa), and an inner diameter of its divergent portion (IDd). In one embodiment, nozzle 12 may have an IDa of approximately 0.348 inches, and an IDd of approximately 0.602 inches. Inner diameter of the arc portion (IDa) will affect the exit velocity of the plasma gas leaving exit annulus 14, and will also affect the velocity of the sprayed materials at impact on component 170. In one embodiment, for higher velocity operation, IDa may be approximately 0.275 inches.

As shown in FIG. 5, plasma spray gun nozzle 12 has a total length (Ln), which includes an arc length (La) and a divergence length (Ld). Arc length (La) is the portion of total length (Ln) over which the plasma arc is formed, and extends between the electrode (within electrode body 40) and an arc root attachment 13. As described with reference to FIG. 4, plasma gas is heated due to the electrical potential difference (or arc voltage) between the electrode (within electrode body 40) and arc root attachment 13. The plasma gas then expands and/or cools over divergent length (Ld) before it is released from plasma spray gun apparatus 10 (FIG. 5) and impacts component 170 (FIG. 4). Divergent length (Ld) is chosen in order to prevent the arc root from extending beyond exit annulus 14. The power output of plasma gun apparatus 10 is partially dependent on the arc voltage, which in turn is partially dependent on arc length (La). As such, in order to reduce the power output of plasma spray gun apparatus 10, a smaller arc length (La) may be required. Conversely, to increase the power output of a plasma spray gun, a larger arc length (La) may be required. However, modifying the total length (Ln) of plasma spray gun nozzle 12 requires modifying the overall length (L1) of plasma spray gun apparatus 5 (FIG. 4). In order to maintain the length of plasma spray gun body 20 while modifying the arc length (La) of plasma spray gun nozzle 40, one or more couplers 30, 50 (FIGS. 6-8) may be used. It is understood that plasma spray gun body 20 may include a water sleeve (not shown) at least partially surrounding nozzle 12, to allow for coolant to flow around the exterior of nozzle 12. However, depiction and description of the water sleeve have been omitted from this description for the purposes of clarity.

Figure 6:
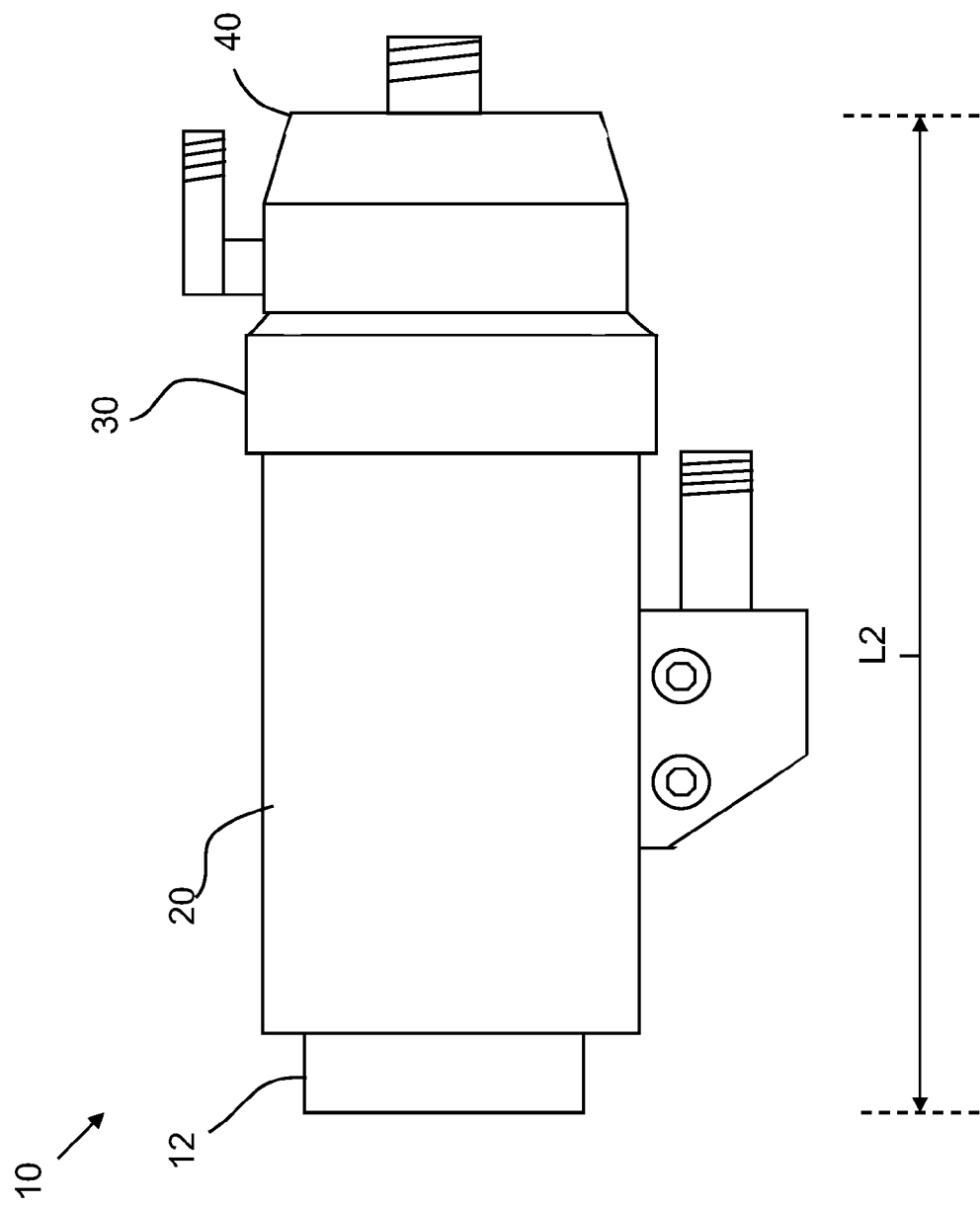
FIG. 6 shows a side view of an adjustable plasma spray gun apparatus according to an embodiment of the invention.
Figure 10:
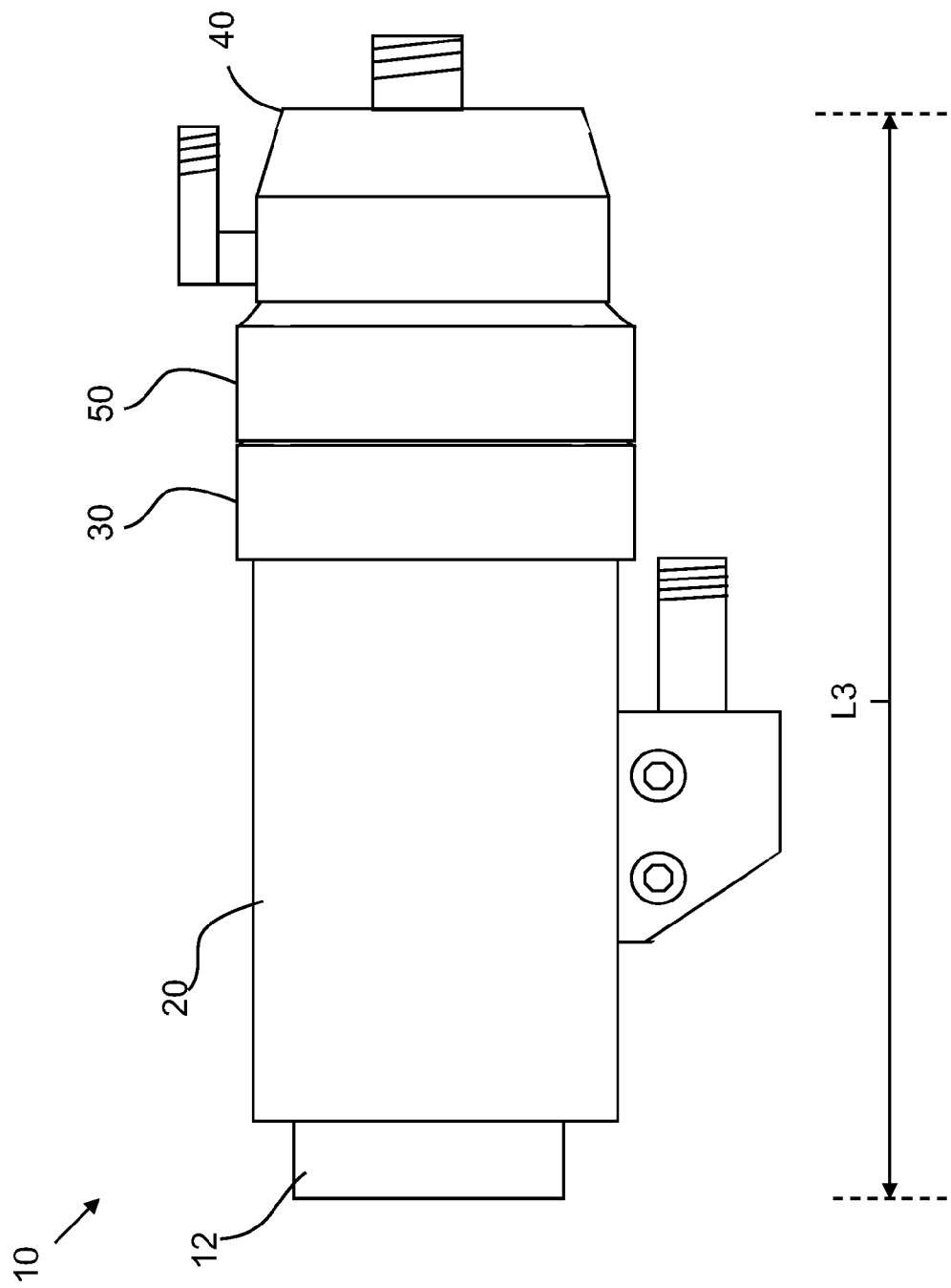
FIG. 10 shows a side view of an adjustable plasma spray gun apparatus according to an embodiment of the invention.

Turning to FIG. 6, a side view of one embodiment of an adjustable plasma spray gun apparatus 10 is shown. Adjustable plasma spray gun apparatus 10 may include plasma spray gun body 20 housing nozzle 12, a coupler 30 and an electrode body 40 housing an electrode. In this embodiment, adjustable plasma spray gun apparatus 10 may have a total length L2, which is greater than the total length L1 shown and described with reference to FIG. 4 In one embodiment, where adjustable plasma spray gun apparatus 10 has a length L1 (FIG. 4), it may produce a minimum power level (e.g., 50 kW). In contrast, in another embodiment, where adjustable plasma spray gun apparatus 10 has a length L2), it may produce a greater power level (e.g., 100 kW, 150 kW). It is understood that in different embodiments of the invention, adjustable plasma spray gun apparatus 10 may produce an even greater power level (e.g., 200 kW), and have a different length (L3) (FIG. 9). Power levels of adjustable plasma spray gun apparatus 10 may be manipulated using one or more couplers 30, 50 (FIG. 6), one of a plurality of plasma spray gun nozzles 12 and configurations (FIG. 10).

Figure 7:
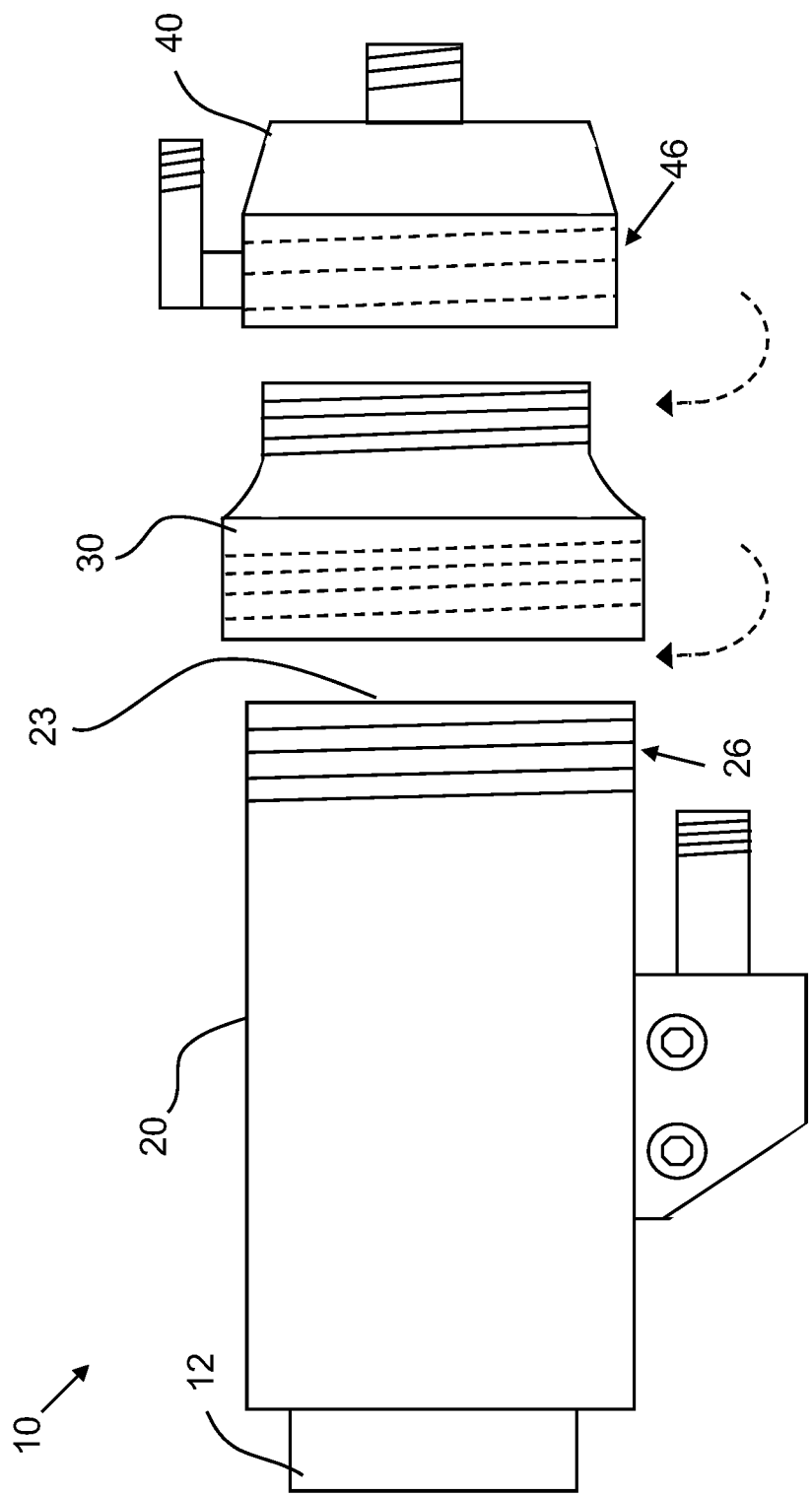
FIG. 7 shows a side view of components of an adjustable plasma spray gun apparatus according to an embodiment of the invention.

Turning to FIG. 7, a side view of separated components of adjustable plasma spray gun apparatus 10 is shown. As shown in FIG. 7, adjustable plasma spray gun apparatus 10 may include plasma spray gun body 20 housing nozzle 12, coupler 30 and electrode body 40 housing an electrode. Components of adjustable plasma spray gun apparatus 10 are shown separated, and not in their functional state, for illustrative purposes. However, as indicated by the dashed arrows, coupler 30 is configured to removably attach to plasma spray gun body 20. Further, electrode body 40 is configured to removably attach to either coupler 30 (as shown), or directly to plasma spray gun body 20 (not shown). In one embodiment, plasma spray gun body 20 may have an axial opening 23, and may include a plurality of external threads 26 for removably attaching to coupler 30 or electrode body 40. External threads 26 may be complementary to internal threads of coupler 30 (FIG. 8A) and electrode body 40. In one embodiment, plasma spray gun apparatus 10 is configured to operate at approximately 70 percent thermal efficiency and greater than approximately 70 percent deposition efficiency throughout a plasma spray gun apparatus power range of approximately 50 kW to approximately 200 kW. That is, in this embodiment, plasma spray gun body 20 may remain affixed on a robotic arm or the like, while performing efficient plasma spraying at a wide range of power modes.

Turning to FIGS. 8 and 9, a side view and a cross-sectional front view, respectively, of coupler 30 are shown. FIGS. 8-9 show one embodiment of coupler 30, including a first portion 32 having a first axial opening 33 including a plurality of internal threads 36. In this embodiment, first portion 32 may be configured to removably attach to plasma spray gun body 20 via plurality of internal threads 36 (of coupler 30) and external threads 26 of plasma spray gun 20 (FIG. 7). In this embodiment plasma spray gun body 20 may remain affixed to, for example, a robotic arm, while coupler 30 is rotatably affixed to gun body 20. This may involve, for example, a human operator physically rotating first portion 32 about external threads 26 of plasma spray gun body 20. It is understood that while components of adjustable plasma spray gun apparatus 10 (FIG. 7) are shown and described herein as being removably attached to one another via complementary threads, other forms of removable attachment are possible. For example, components of adjustable plasma spray gun apparatus 10 may be removably attached to one another via bayonet-type connectors or other suitable connectors. In one embodiment, coupler 30 may have a major diameter D1 (first portion 32) of approximately 2.745 inches (in) and a minor diameter D2 (second portion 34) of approximately 2.375 inches. In this embodiment, coupler 30 may further have a length (Lc) of approximately 1.373 inches. It is understood that multiple couplers 30 may be used to extend the length (L) of adjustable plasma spray gun apparatus 10, and that couplers having different lengths (Lc) may be used alone, or in conjunction with additional couplers 50 (FIG. 8).

With continuing reference to FIGS. 8-9, and FIG. 7, coupler 30 is further shown including a second portion 34, having a second axial opening 35. In one embodiment, coupler 30 may include a plurality of external threads 38. In this case, second portion 34 may be configured to removably attach to one of electrode body 40 or a second coupler (not shown) via external threads 38 and internal threads 46 of electrode body 40. It is understood, however, that second portion 34 may be configured to removably attach to one of electrode body 40 or a second coupler via any means described with respect to first portion 32 and plasma spray gun body 20. Further, second portion 34 and first portion 32 may removably attach to other components of adjustable plasma spray gun apparatus 10 in manners distinct from one another. For example, first portion 32 may include a plurality of external threads, while second portion 34 may include another attachment mechanism (e.g., portions of a clasping mechanism, apertures for receiving screws or bolts, a bayonet-type connection etc.). In the case that second portion 34 includes external threads 38, internal threads 46 of electrode body 40 may complement external threads 38 of coupler 30, as well as external threads 26 of plasma spray gun body 20. Further, multiple couplers 30 may be removably attached to one another via, for example, their internal threads 36 and external threads 38, respectively, which complement each other. That is, the length (L1) of adjustable plasma spray gun apparatus 10 may be manipulated by the addition or subtraction of one or more couplers 30 to plasma spray gun body 20.

For example, as shown in FIG. 10, in one embodiment, adjustable plasma spray gun apparatus 10 may include plasma spray gun body 20 housing nozzle 12, first coupler 30, a second coupler 50, and electrode body 40. In this embodiment, second coupler 50 may be removably attached to first coupler 30 and electrode body 40. In one embodiment, second coupler 50 may be removably attached to first coupler 30 and electrode body 40 via internal and external threads (not shown), respectively. Second coupler 50 may have a substantially similar attachment mechanism (e.g., threads, clasps, bayonet-type connections, etc.) as first coupler 30, which may facilitate attachment of first coupler 30 and second coupler 50. Second coupler 50 may be substantially similar in length to first coupler 30, or may have a substantially different length (Lc) than first coupler 30. In one embodiment, second coupler 50 may have a length (Lc) approximately twice that of first coupler 30. In another embodiment, second coupler 50 may have a length (Lc) of approximately 2.183 inches, this length being less than twice that of first coupler 30. In any case, second coupler 50 may allow for extension of adjustable plasma spray gun apparatus 10 to a length L3. As described herein, adjusting the length (L1, L2, L3) of plasma spray gun apparatus 10 may allow for increased or decreased power output, which may accommodate plasma spraying of a range of parts and materials without the need to remove plasma spray gun body 20 from arm connector 172 (or the like). This may also for adjusting the length (L1, L2, L3) of plasma spray gun apparatus 10 from the aft portion (opposite exit annulus 14) without changing the designed standoff distance SD.

Figure 11:
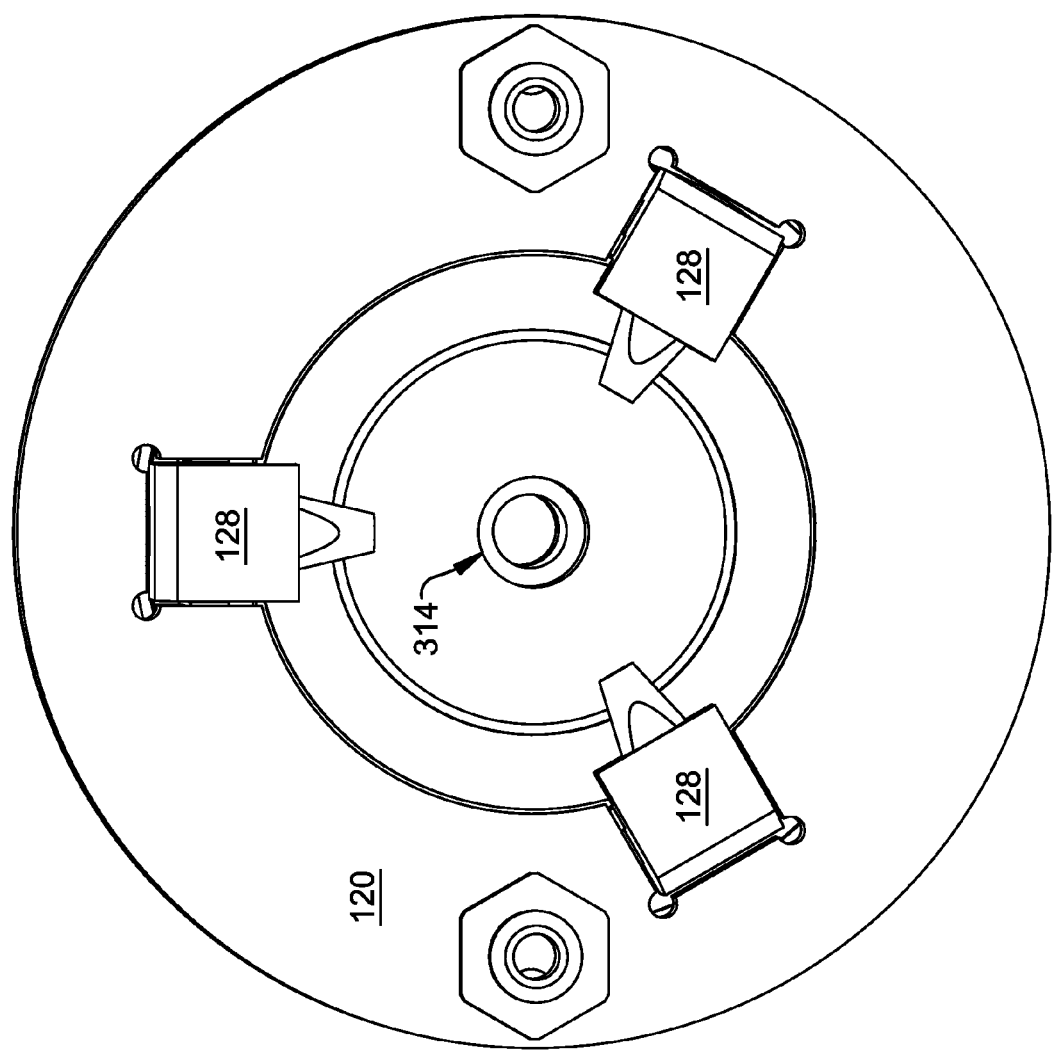
FIG. 11 shows a schematic view of an embodiment of a system in accordance with an aspect of the invention.

Turning to FIG. 11, a schematic illustration of a portion of a plasma spray gun 120 including a set of conduits 128 (e.g., injectors, powder nozzles, etc.) disposed about an exit annulus 314 of plasma spray gun 120 is shown in accordance with embodiments of the invention. In an embodiment, set of conduits 128 may be disposed equidistantly (e.g., in a circumferential pattern) about exit annulus 314. Each conduit in set of conduits 128 is disposed at substantially equivalent radial and circumferential magnitudes/increments (e.g., degrees, millimeters, etc.) relative to one another and exit annulus 314. In one embodiment, set of conduits 128 may include three conduits each disposed 120 degrees apart from one another relative to exit annulus 314. Set of conduits 128 may be configured to introduce thermal spray materials (e.g., powder, ceramic powder, metallic powder, etc) into a flow from exit annulus 314 in anticipation of application to a surface (e.g., machine component 170). In an embodiment, this triple powder injection system provides for symmetric powder delivery to the spray plume resulting in a coating deposit on centerline with the exit annulus 314 (e.g., anode bore). This may produce improved target efficiency given that the robotic motion program is based on anode centerline aiming to the target to be sprayed, thereby reducing process cycle time and is improving powder usage.

Figure 12:
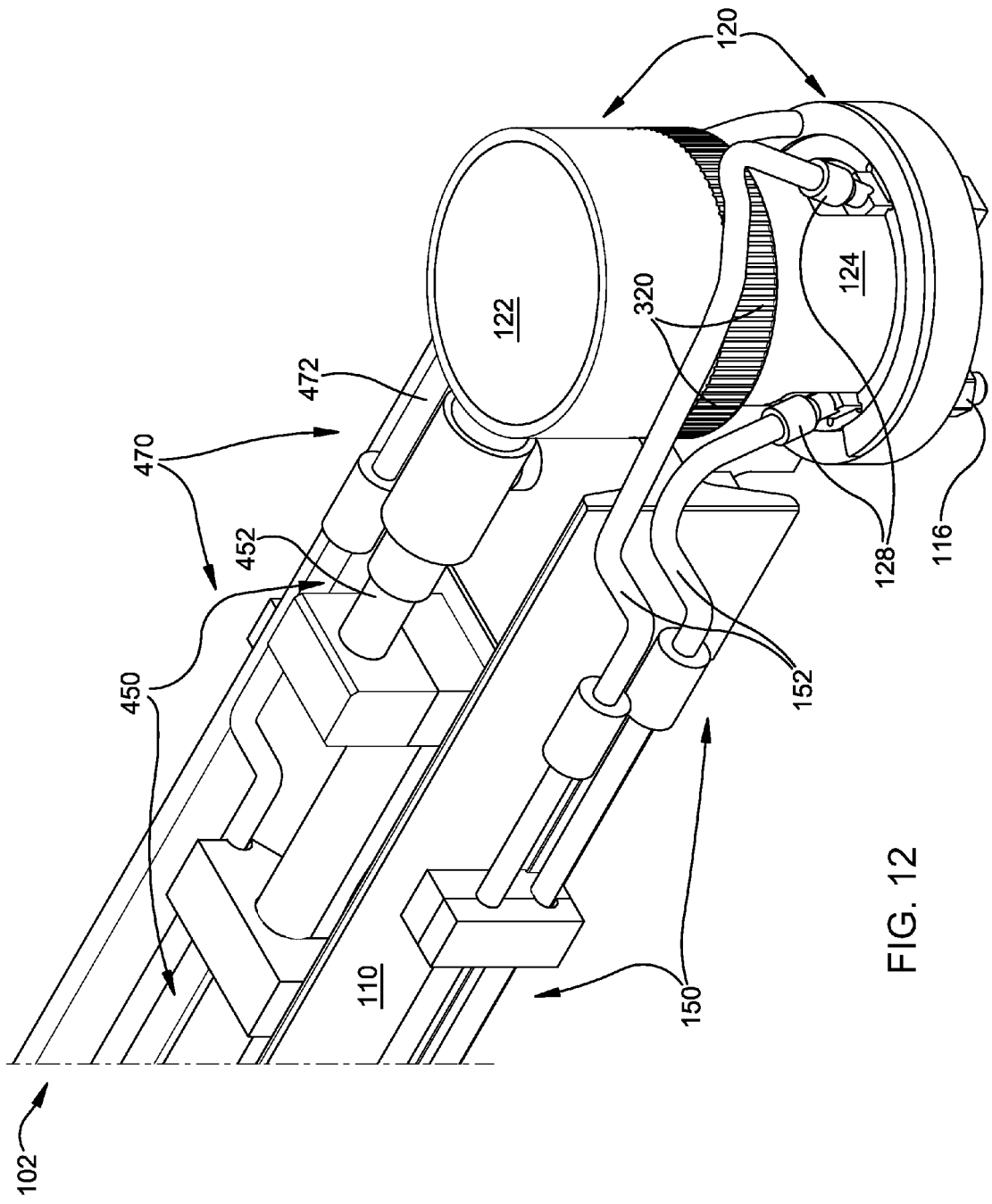
FIG. 12 shows a schematic view of an embodiment of a machine component in accordance with an aspect of the invention.

Turning to FIG. 12, a schematic illustration of a portion of a universal plasma extension gun system 102 is shown in accordance with embodiments of the invention. In an embodiment, plasma spray gun 120 is disposed on plasma extension arm 110 and configured to apply a thermal spray coating to component 170 (shown in FIGS. 1 and 2). In this embodiment, plasma spray gun 120 is connected to a first set of feed conduits 150 which are configured to supply a flow of powder to set of conduits 128 for application to component 170 via a set of ports 116 and exit annulus 314 (shown in FIG. 11). First set of feed conduits 150 may be connected to set of conduits 128 via a set of coupler feed conduits 152 which may be configured to accommodate adjustments to dimensions of plasma spray gun 120 as a result of varied coupler installations and configurations. In an embodiment, set of coupler feed conduits 152 may be adjustable and/or detachable from plasma spray gun 120 and plasma extension arm 110. A power supply source (not shown) and a propellant source (not shown) may be connected to plasma spray gun 120 via a first power supply conduit 450 and a first propellant supply conduit 470. In an embodiment, power supply conduit 450 and first propellant supply conduit 470 may be connected to either or both of plasma spray gun 120 and/or plasma extension arm 110 via a coupler power conduit 452 and a coupler propellant conduit 472. Coupler power conduit 452 and coupler propellant conduit 472 may be adjustable and/or detachable from plasma spray gun 120 and/or plasma extension arm 110.

Figure 13:
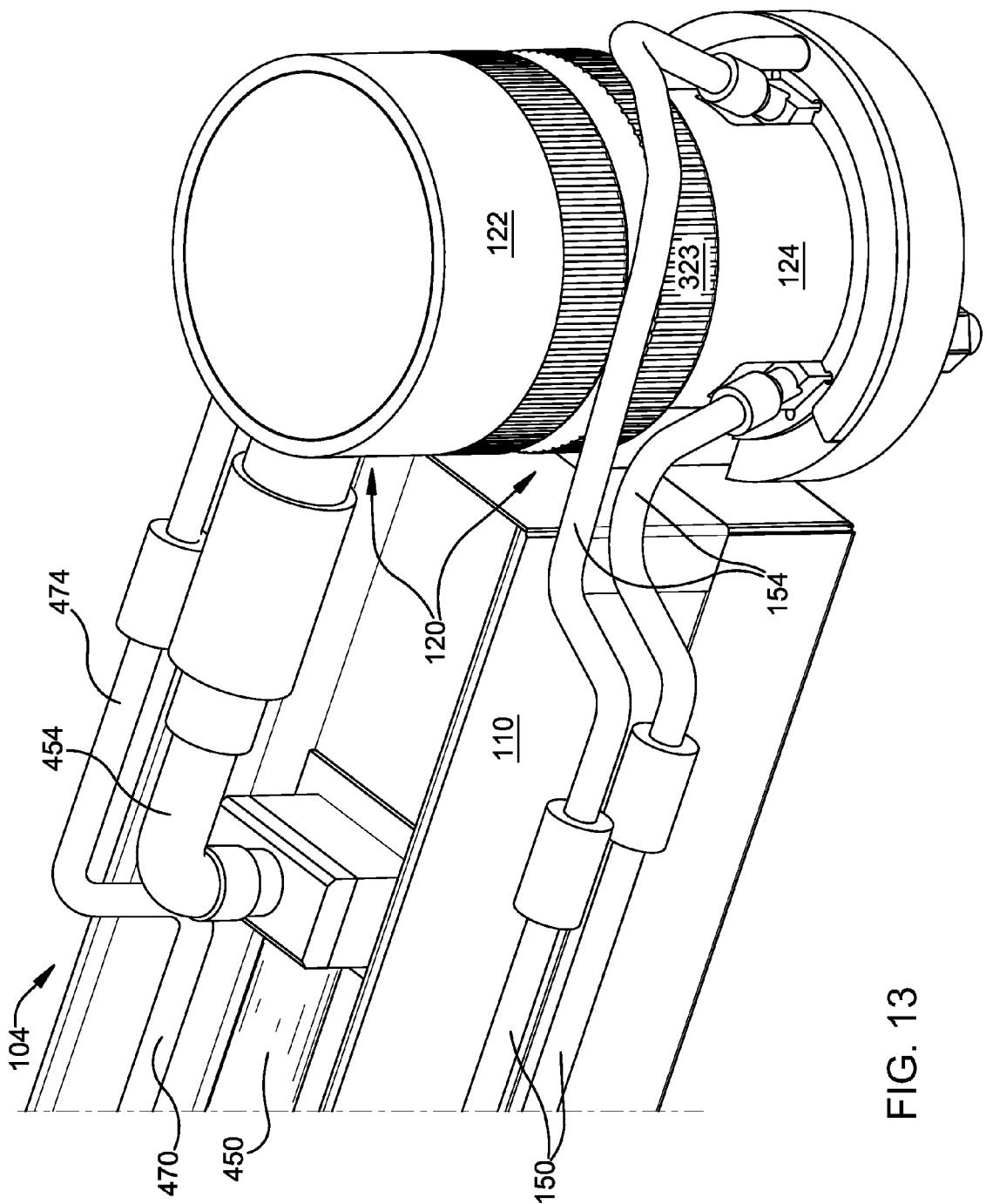
FIG. 13 shows a schematic view of an embodiment of a system in accordance with an embodiment of the invention.

Turning to FIG. 13, a schematic illustration of a portion of a universal plasma extension gun system 104 is shown in accordance with embodiments of the invention. In an embodiment, plasma spray gun 120 includes a coupler 323 and is disposed on plasma extension arm 110 and configured to apply a thermal spray coating to component 170 (shown in FIGS. 1 and 2). Coupler 323 may be configured to adjust operation (e.g., arc size) of plasma spray gun 120 as described herein. In this embodiment, plasma spray gun 120 is connected to first set of feed conduits 150 which are configured to supply a flow of powder to set of conduits 128 for application to component 170 via a set of ports 116 and exit annulus 314 (shown in FIG. 11). First set of feed conduits 150 may be connected to set of conduits 128 via a set of coupler feed conduits 154 which may be configured to accommodate adjustments to dimensions of plasma spray gun 120 as a result of varied coupler installations and configurations. In an embodiment, set of coupler feed conduits 154 may be adjustable and/or detachable from plasma spray gun 120 and plasma extension arm 110. A power supply source (not shown) and a propellant source (not shown) may be connected to plasma spray gun 120 via first power supply conduit 450 and first propellant supply conduit 470. In an embodiment, power supply conduit 450 and first propellant supply conduit 470 may be connected to either or both of plasma spray gun 120 and/or plasma extension arm 110 via a coupler power conduit 454 and a coupler propellant conduit 474 respectively. Coupler power conduit 454 and coupler propellant conduit 474 may be adjustable and/or detachable from plasma spray gun 120 and/or plasma extension arm 110.

Figure 14:
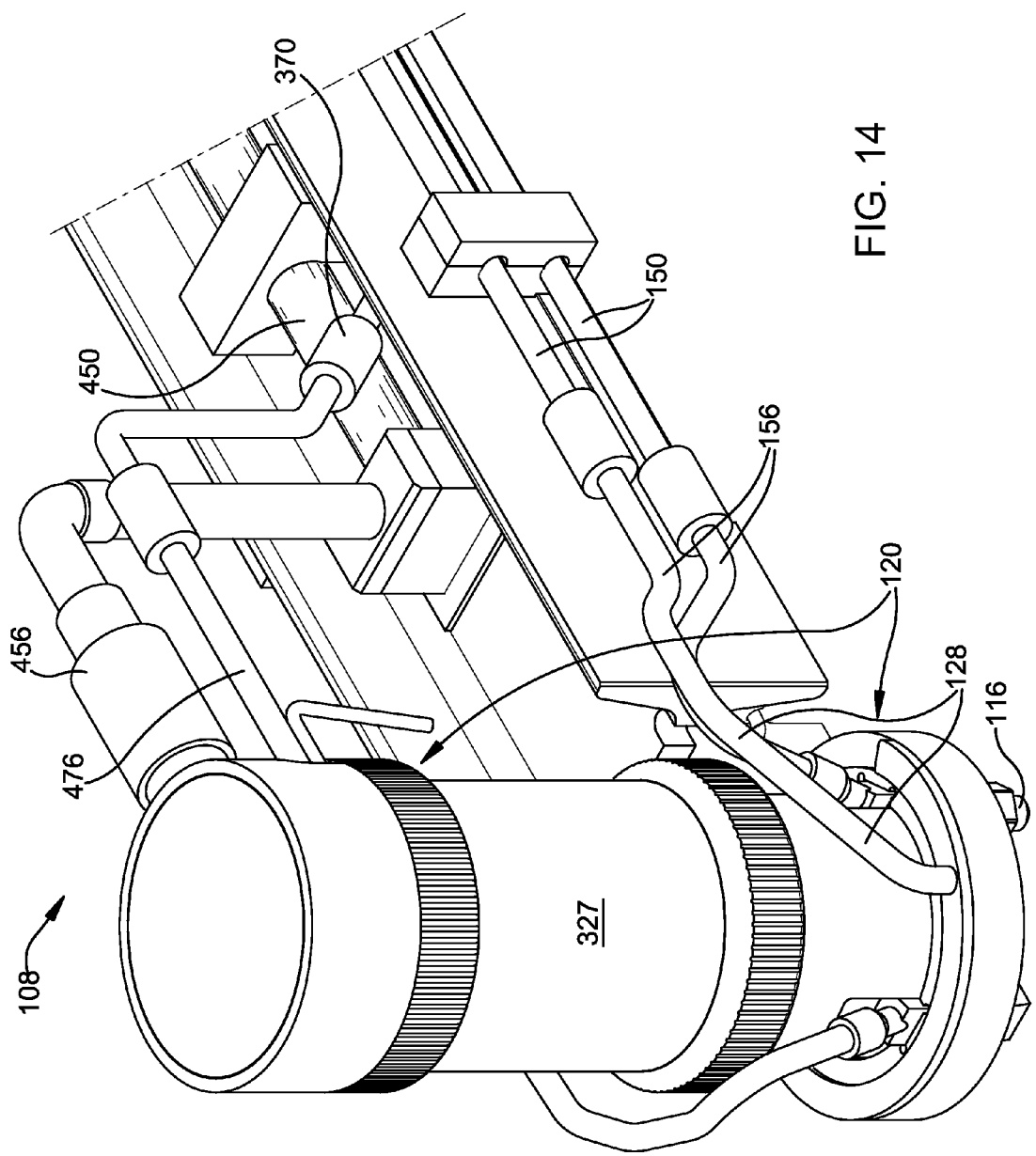
FIG. 14 shows a schematic illustration of an environment including a control system in accordance with an embodiment of the invention.

Turning to FIG. 14, a schematic illustration of a portion of a universal plasma extension gun system 108 is shown in accordance with embodiments of the invention. In an embodiment, plasma spray gun 120 includes a coupler 327 and is disposed on plasma extension arm 110 (shown in FIG. 13) and configured to apply a thermal spray coating to component 170 (shown in FIGS. 1 and 2). Coupler 327 may be configured to adjust operation (e.g., arc size) of plasma spray gun 120 as described herein. In this embodiment, plasma spray gun 120 is connected to first set of feed conduits 150 which are configured to supply a flow of powder to set of conduits 128 for application to component 170 via a set of ports 116 and exit annulus 314 (shown in FIG. 11). First set of feed conduits 150 may be connected to set of conduits 128 via a set of coupler feed conduits 156 which may be configured to accommodate adjustments to dimensions of plasma spray gun 120 as a result of varied coupler installations and configurations. In an embodiment, set of coupler feed conduits 156 may be adjustable and/or detachable from plasma spray gun 120 and plasma extension arm 110. A power supply source (not shown) and a propellant source (not shown) may be connected to plasma spray gun 120 via first power supply conduit 450 and first propellant supply conduit 470. In an embodiment, power supply conduit 450 and first propellant supply conduit 470 may be connected to either or both of plasma spray gun 120 and/or plasma extension arm 110 via a coupler power conduit 456 and a coupler propellant conduit 476 respectively. Coupler power conduit 456 and coupler propellant conduit 476 may be adjustable and/or detachable from plasma spray gun 120 and/or plasma extension arm 110.

Figure 15:
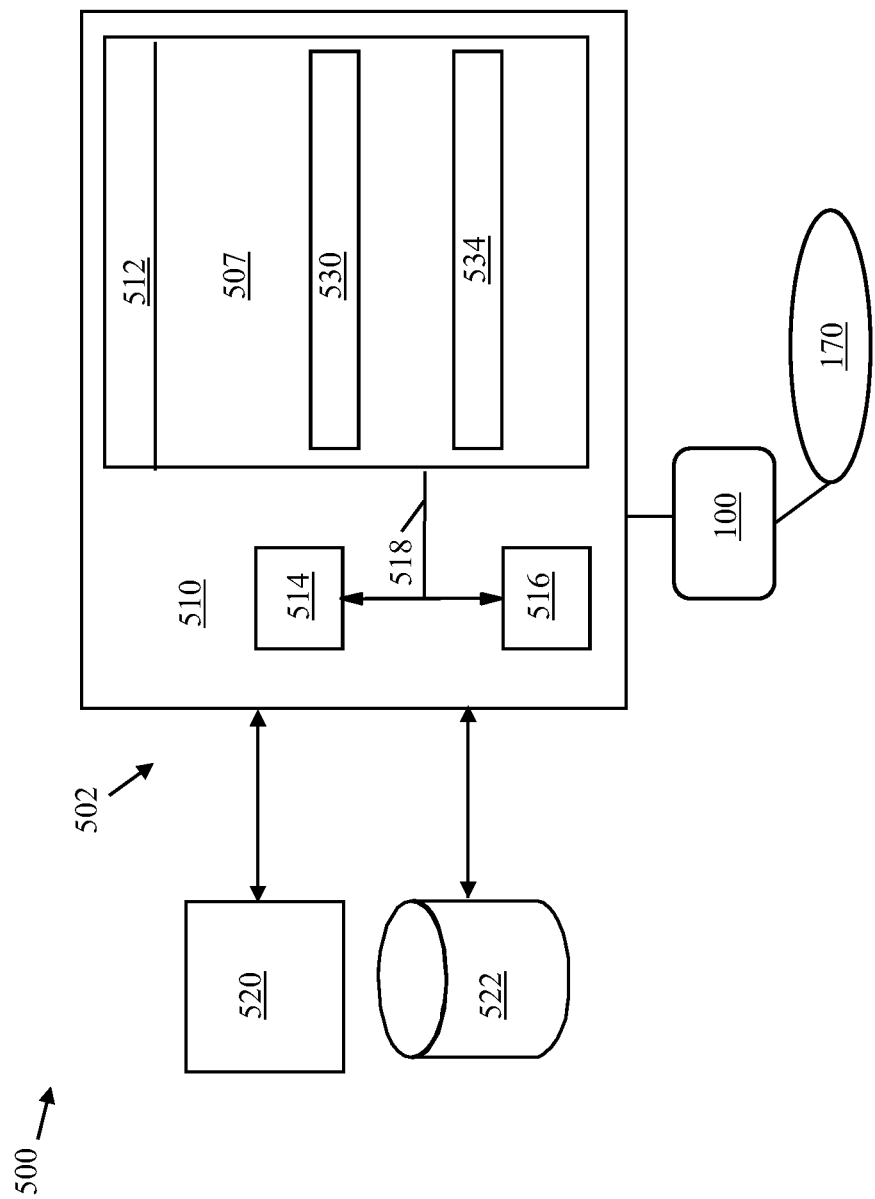
FIG. 15 shows a method flow diagram illustrating a process according to embodiments of the invention.

Turning to FIG. 15, an illustrative environment 500 including a universal plasma extension gun control system 507 is shown according to embodiments of the invention. Environment 500 includes a computer infrastructure 502 that can perform the various processes described herein. In particular, computer infrastructure 502 is shown including computing device 510 which includes universal plasma extension gun control system 507, which enables computing device 510 to coat portions of machine component 170 (e.g., joints, surfaces, conduits, interior diameters, etc.) by performing the process steps of the disclosure. In one embodiment, computing device 510 may manipulate plasma spray gun 120 about machine component 170 and guide application of a coating therein and/or upon.

As previously mentioned and discussed further below, universal plasma extension gun control system 507 has the technical effect of enabling computing device 510 to perform, among other things, the manipulation and application described herein. It is understood that some of the various components shown in FIG. 15 can be implemented independently, combined, and/or stored in memory for one or more separate computing devices that are included in computing device 510. Further, it is understood that some of the components and/or functionality may not be implemented, or additional schemas and/or functionality may be included as part of universal plasma extension gun control system 507.

Computing device 510 is shown including a memory 512, a processor unit (PU) 514, an input/output (I/O) interface 516, and a bus 518. Further, computing device 510 is shown in communication with an external I/O device/resource 520 and a storage system 522. As is known in the art, in general, PU 514 executes computer program code, such as universal plasma extension gun control system 507, that is stored in memory 512 and/or storage system 522. While executing computer program code, PU 514 can read and/or write data, such as graphical user interface 530 and/or operational data 534, to/from memory 512, storage system 522, and/or I/O interface 516. Bus 518 provides a communications link between each of the components in computing device 510. I/O device 520 can comprise any device that enables a user to interact with computing device 510 or any device that enables computing device 510 to communicate with one or more other computing devices. Input/output devices (including but not limited to keyboards, displays, pointing devices, etc.) can be coupled to the system either directly or through intervening I/O controllers.

In some embodiments, as shown in FIG. 15, environment 500 may optionally include universal plasma extension gun system 100 disposed proximate component 170 and communicatively connected to computing device 510 (e.g., via wireless or hard-wired means). Universal plasma extension gun system 100 may automatically and/or programmably (e.g., via a technicians commands) thermally spray/coat machine component 170 and manipulate plasma spray gun about machine component 170.

In any event, computing device 510 can comprise any general purpose computing article of manufacture capable of executing computer program code installed by a user (e.g., a personal computer, server, handheld device, etc.). However, it is understood that computing device 510 is only representative of various possible equivalent computing devices and/or technicians that may perform the various process steps of the disclosure. To this extent, in other embodiments, computing device 510 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 510 may be/include a distributed control system.

It should be emphasized that the preceding figures and written description include examples of embodiments of an universal plasma extension gun system. It is understood that specific numerical values (e.g., physical dimensions, power levels, etc.) are included merely for illustrative purposes, and are not limiting. The teachings of this written description may be applied to plasma spray gun systems having, for example, different sized components functioning at different power levels than those described herein and/or illustrated in the figures.

The system of the present disclosure is not limited to any one particular machine, driven machine, turbine, fan, blower, compressor, power generation system or other system, and may be used with other power generation systems and/or systems (e.g., combined-cycle, simple-cycle, nuclear reactor, etc.). Additionally, the system of the present invention may be used with other systems not described herein that may benefit from the inspection, testing, and evaluative capabilities of the system described herein.

As will be appreciated by one skilled in the art, the system described herein may be embodied as a system(s), method(s), operator display (s) or computer program product(s), e.g., as part of a power plant system, a power generation system, a turbine system, etc. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A plasma gun extension system comprising:
   a plasma extension arm, wherein a length of the plasma extension arm is extendable;
   an arm connector disposed on the plasma extension arm and configured to connect to an adjustable plasma spray gun apparatus;
   an arm coupler disposed on the plasma extension arm and configured to connect the plasma extension arm to a robotic arm;
   a set of feed conduits disposed on the plasma extension arm between the arm coupler and the arm connector, the set of feed conduits configured to supply a flow to the adjustable plasma spray gun apparatus;
   a power supply conduit disposed on the plasma extension arm and configured to connect to the adjustable plasma spray gun apparatus via a coupler power conduit; and
   a propellant supply conduit disposed on the plasma extension arm and configured to connect to the adjustable plasma spray gun apparatus via a coupler propellant conduit.

2. The plasma gun extension system of claim 1, further comprising a set of coupler feed conduits connected to the set of feed conduits and configured to connect to a set of ports disposed on the adjustable plasma spray gun apparatus.

3. The plasma gun extension system of claim 1, wherein the plasma extension arm is telescopic.

4. The plasma gun extension system of claim 1, wherein the plasma extension arm is shaped to extend within an interior portion of a turbine component.

5. A universal plasma extension gun system comprising:
   a plasma extension arm configured to extend in to an interior portion of a component, wherein a length of the plasma extension arm is extendable;
   an adjustable plasma spray gun connected to the plasma extension arm, the adjustable plasma spray gun including:
     an electrode body housing an electrode;
     a plasma spray gun body having a fore portion and an aft portion, the aft portion having an axial opening configured to removably attach to one of the electrode or a first coupler; and
     the first coupler removably attached to the plasma spray gun body at the axial opening of the plasma spray gun body, the coupler including:
       a first portion having a first axial opening configured to removably attach to the plasma spray gun body; and
       a second portion having a second axial opening configured to removably attach to one of the electrode body or a second coupler; and
   a set of feed conduits disposed on the plasma extension arm and configured to supply a flow to the adjustable plasma spray gun;
   a power supply conduit disposed on the plasma extension arm and configured to connect to the adjustable plasma spray gun via a coupler power conduit; and
   a propellant supply conduit disposed on the plasma extension arm and configured to connect to the adjustable plasma spray gun via a coupler propellant conduit.

6. The universal plasma extension gun system of claim 5, further comprising a set of coupler feed conduits connected to the set of feed conduits and configured to connect to a set of ports disposed on the adjustable plasma spray gun.

7. The universal plasma extension gun system of claim 5, further comprising:
   an arm connector disposed on the plasma extension arm and configured to connect to the adjustable plasma spray gun; and
   an arm coupler disposed on the plasma extension arm and configured to connect the plasma extension arm to a robotic arm.

8. The universal plasma extension gun system of claim 5, wherein the adjustable plasma spray gun includes a set of ports disposed on adjustable plasma spray gun proximate the second axial opening, the set of ports disposed substantially symmetrically about the second axial opening.

9. The universal plasma extension gun system of claim 5, wherein the plasma extension arm is telescopic.

10. The universal plasma extension gun system of claim 5, wherein the plasma extension arm has a length of about 50 centimeters to about 200 centimeters.

11. The universal plasma extension gun system of claim 5, further comprising a robotic arm attached to the plasma extension arm.

12. A universal plasma extension gun system comprising:
    a robotic arm;
    a plasma extension arm connected to the robotic arm and configured to extend into an interior portion of a component, wherein a length of the plasma extension arm is extendable;
    an adjustable plasma spray gun connected to the plasma extension arm, the adjustable plasma spray gun including:
      an electrode body housing an electrode,
      a plasma spray gun body defining an exit annulus, and
      a set of ports disposed proximate the exit annulus; and
    a set of feed conduits disposed on the plasma extension arm and configured to supply a flow to the set of ports;
    a power supply conduit disposed on the plasma extension arm and configured to connect to the adjustable plasma spray gun via a coupler power conduit; and
    a propellant supply conduit disposed on the plasma extension arm and configured to connect to the adjustable plasma spray gun via a coupler propellant conduit.

13. The universal plasma extension gun system of claim 12, further comprising a set of coupler feed conduits connected to the set of feed conduits and configured to connect to the set of ports disposed on the adjustable plasma spray gun.

14. The universal plasma extension gun system of claim 12, wherein the set of ports are disposed symmetrically about the exit annulus.

* * * * *